No. 633,140. Patented Sept. 19, 1899.
W. KINSEY.
CAR HEATING SYSTEM.
(Application filed Mar. 23, 1899.)

(No Model.)

Witnesses
Sidney P. Hollingsworth
F. J. Elmore.

Inventor
Warren Kinsey
By Phil. T. Dodge
Attorney

THE NORRIS PETERS CO., PHOTO-LITHO., WASHINGTON, D. C.

United States Patent Office.

WARREN KINSEY, OF PEORIA, ILLINOIS.

CAR-HEATING SYSTEM.

SPECIFICATION forming part of Letters Patent No. 633,140, dated September 19, 1899.

Application filed March 23, 1899. Serial No. 710,181. (No model.)

*To all whom it may concern:*

Be it known that I, WARREN KINSEY, of Peoria, county of Peoria, and State of Illinois, have invented a new and useful Improvement in Car-Heating Systems, of which the following is a specification.

This invention relates to steam car-heating systems, the object being to prevent the drain-water from the radiators freezing in the drain-pipe and thereby interfering with its free discharge; and to this end the invention consists in a jacket or casing provided with a chamber in communication with the train-pipe, through which the steam is supplied, said casing being provided with an opening therethrough surrounded by the chamber and adapted to receive the discharge end of the drain-pipe.

The invention also consists in the details of construction and combination of parts hereinafter described and claimed.

Figure 1:
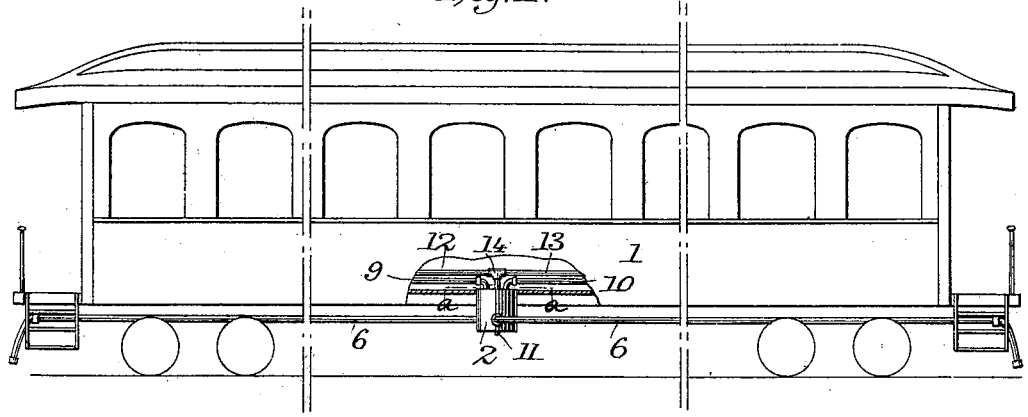
Figure 3:
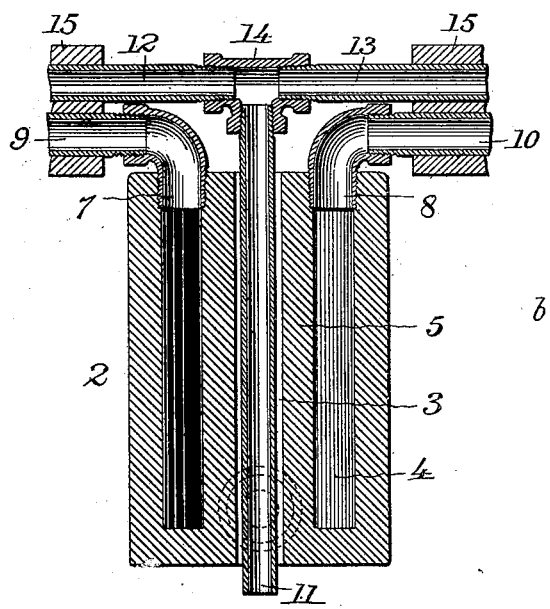
Figure 2:
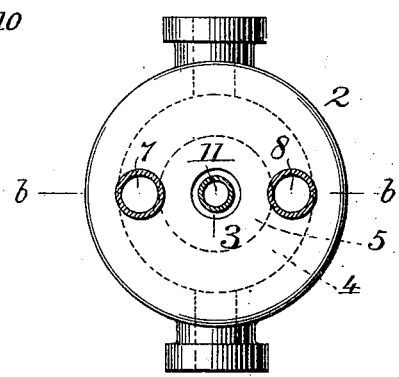

In the accompanying drawings, Figure 1 is an elevation of a car having my invention applied thereto. Fig. 2 is a horizontal sectional elevation on the line $aa$ of Fig. 1. Fig. 3 is a vertical section through the casing on the line $bb$ of Fig. 2.

Referring to the drawings, 1 represents a car, beneath which is mounted a cylindrical casing 2, formed with a vertical central opening 3 therethrough from top to bottom. Within this casing is an annular chamber 4, closed at top and bottom and surrounding the central opening, from which it is separated by the circular wall 5. A train-pipe 6 for the live steam from any suitable source enters the chamber 4 at the lower part of the casing on one side thereof, the casing being formed with an opening through its outer wall through which the steam from the train-pipe enters. Opposite this opening is another opening, to which the other continuing branch of the train-pipe is connected and by which the live steam is conducted to the next car after filling the annular chamber and supplying the radiators. At the top of the casing openings 7 and 8 are formed, communicating with the annular chamber, and to these openings are connected, respectively, the inner ends of steam-supply pipes 9 and 10, which are extended in opposite directions to the opposite ends of the car to supply the heating radiators or coils, as the case may be. As a result of this arrangement the live steam before entering the supply-pipes 9 and 10 fills and circulates through the annular chamber in the casing, the result being that the casing is heated and maintained in this condition as long as the supply of steam is maintained. I propose to utilize this heat of the casing to prevent the freezing of the water in the discharge end of the drain-pipe by extending this pipe downward vertically, as at 11, through the opening 3 in the casing, as clearly shown in Fig. 3, the result being that surrounded by the steam-filled chamber 4 and the heated partition 5 the drain-pipe will be kept warm and the water therein prevented from freezing and interfering with its discharge. The drain-pipes from the coils 12 and 13 extend from the opposite ends of the car and join the vertical discharge-pipe 11 above the upper end of the casing, where they form, in connection with the vertical discharge-pipe, a T-joint 14. It will be observed that by reason of this connection of the drain-pipes from the opposite ends of the car with the vertical discharge-pipe at a point over the opening in the casing and by reason of the connection of the supply-pipes 9 and 10 with the chamber 4 the drain and supply pipes extend closely together and parallel, so that I am enabled to surround both with a single cover 15, as shown in Fig. 3. It is seen, therefore, that as a result of my construction and arrangement the discharge end of the drain-pipe is wholly surrounded by the live steam supplied by the train-pipe, and I believe myself to be the first to attain this end. I believe myself also to be the first to extend the return-pipes from the opposite ends of the car closely alongside the supply-pipes and connect the same with the vertical discharge-pipe at a point between the ends of the supply-pipes.

Having thus described my invention, what I claim is—

1. In a car-heating system the combination with a drain-pipe provided with a depending end having an unobstructed discharge-opening and situated outside the car, of a casing also situated outside the car and formed with an annular chamber wholly surrounding the depending discharge end of the drain-pipe, a train-pipe for the live steam connected with the annular chamber, and a connection between said chamber and the heating-coils.

2. In a car-heating system the combination with a vertical casing situated outside the car and provided with an annular chamber closed at top and bottom and with a central opening separated from the chamber by an annular surrounding wall 5, of a drain-pipe provided with a depending end having an unobstructed discharge-opening and extending through the central opening and separated from the surrounding wall, a train-pipe connected with the annular chamber, and a connection between the annular chamber and the heating-coils.

3. The combination with a vertical casing provided with a vertical annular chamber having an opening therethrough surrounded by the chamber, of a train-pipe communicating with the chamber, two horizontal supply-pipes communicating with the chamber at or near the top of the casing and extending in opposite directions to the radiators, two drain-pipes extending alongside the supply-pipes at a point above the opening in the casing and a vertical discharge-pipe connected with the drain-pipes and extending downward through the opening in the casing.

In testimony whereof I hereunto set my hand, this 11th day of March, 1899, in the presence of two attesting witnesses.

WARREN KINSEY.

Witnesses:
L. A. KINSEY,
C. E. ROBERTS.